United States Patent [19]

Conway

[11] 4,301,987

[45] Nov. 24, 1981

[54] SHELF DISPLAY CLIP

[76] Inventor: Gerald A. Conway, 3133 Fairfax Rd., Cleveland Heights, Ohio 44118

[21] Appl. No.: 969,831

[22] Filed: Dec. 15, 1978

[51] Int. Cl.[3] .............................................. F16M 13/00
[52] U.S. Cl. .................................. 248/221.4; 248/307
[58] Field of Search ..................... 248/73, 220.3, 220.4, 248/221.1, 221.2, 221.3, 221.4, 225.3, 307, 311.1 R, 225.3 A; 274/42

[56] References Cited

U.S. PATENT DOCUMENTS

| | | | |
|---|---|---|---|
| 1,223,998 | 4/1917 | Maynard | 248/307 |
| 1,651,987 | 12/1927 | Baker | 248/311.1 X |
| 1,807,356 | 5/1931 | Vance | 248/307 |
| 2,521,977 | 9/1950 | Huth | 248/225.3 A |
| 2,619,351 | 11/1952 | Kennedy | 274/42 R X |
| 2,712,943 | 7/1955 | Morrison | 274/42 R |
| 2,983,475 | 5/1961 | Slavsky | 248/221.4 |
| 3,034,756 | 5/1962 | Ka Dell | 248/221.4 |
| 3,151,793 | 10/1964 | Smith | 248/311.1 X |
| 3,171,565 | 3/1965 | Nozette | 248/220.3 X |
| 3,214,122 | 10/1965 | Frederickson | 248/221.4 |
| 3,216,184 | 3/1964 | Kropp | 248/73 |
| 3,288,414 | 11/1966 | Fortunato | 248/221.4 |
| 3,297,290 | 1/1967 | Patterson | 248/221.4 X |
| 4,168,067 | 9/1979 | Wiczer | 248/221.4 X |

FOREIGN PATENT DOCUMENTS

| | | | |
|---|---|---|---|
| 2706002 | 8/1978 | Fed. Rep. of Germany | 248/221.4 |

*Primary Examiner*—William H. Schultz
*Attorney, Agent, or Firm*—Maky, Renner, Otto & Boisselle

[57] ABSTRACT

A shelf display clip for mounting display and/or informational literature and material is adapted to be secured to an elongate channel extrusion such as the type which is commonly provided on a stock shelf in a grocery store for retention of computer price cards and numerals. The display clip includes a main clip element having a center body portion and at least two radiating legs, each leg having integrally formed at the outer end thereof a wedge foot and being resiliently deflectable for insertion into a channel defined by opposed parallel lips on the front face of such channel extrusion with the feet being urged by the resilience of the legs into tight engagement with at least one of the lips firmly to hold the display clip to the extrusion. A male fastener element such as a dart or button fastener is receivable with a lock or friction fit in a forwardly opening bore in the center portion and/or an offset portion of the display clip for securing the display and/or informational material or a container for such material to the main clip element either with a perpendicular or flush mount.

6 Claims, 14 Drawing Figures

SHELF DISPLAY CLIP

BACKGROUND OF THE INVENTION

This invention relates to a shelf display clip and more particularly to a shelf display clip adapted for use with a channel extrusion such as the type which is commonly employed on a grocery store stock shelf for retention of computer price cards and/or other informational material, such display clip providing for mounting of display and/or informational material such as "take-one" pads, recipes, coupon offers, premium offers, display containers for folders or samples, products, or like items at locations where such items may be readily noticed by shoppers and where a shopper may easily remove one of such items mounted by such shelf display clip.

Grocery store stock shelves are commonly provided with elongate channel extrusions along the forward edges thereof in which may be inserted computer price cards and/or other informational material usually concerning the products stocked on the shelf for sale. Oftentimes, in connection with such products, it is desirable to provide free recipes, coupons, special offers or the like for the shopper to induce the same to purchase the products. Such items are often in the form of cards which the shopper is invited to take one. Other times, it is desirable to draw a shopper's attention to a special sale or the like for the particular products stocked on the shelf. To obtain the attention of the shopper, it is desirable to display such sale and/or other display information with the same projecting forwardly into the aisle perpendicular to the shelf so that the shopper can view the same when at a location down the aisle therefrom.

OBJECTS OF THE INVENTION

One of the objects of this invention is to provide a shelf display clip which can be easily and readily inserted and retained in a channel extrusion such as is commonly provided on grocery store stock shelves and which can support a variety of display and/or informational material.

Another object of this invention is to provide a shelf display clip which is readily and easily insertable in the channel extrusion of a stock shelf and is firmly retained therein while permitting the clip to slide along the length of the channel for positioning of the same.

Still another object of this invention is to provide a shelf display clip having provision for supporting display and/or informational material flush with and/or perpendicular to the shelf channel extrusion in which it is retained.

Yet another object of this invention is to provide a shelf display clip which will fit in a wide range of sizes of channels in the channel extrusions and in channel extrusions of different types.

A further object of this invention is to provide a shelf display clip of the above character wherein the display and/or informational material supported by the display clip may be easily removed by a shopper and/or replenished by the displayer.

Yet a further object of this invention is to provide such a shelf display clip having provision for mounting display and/or informational material below the channel extrusion so as not to obscure from view any informational material held by the channel extrusion.

Still a further object of this invention is to provide a shelf display clip of the above character wherein the parts are inexpensive and are so made that they can be economically packaged with the display and/or informational material for transmission to a displayer who is to use them.

Another further object of this invention is to provide a shelf display clip wherein the display and/or informational material such as sheets of literature supported by the clip is securely supported on the shelf channel extrusion so as to permit easy removal of one sheet from a pad of sheets by a shopper without the pad itself being inadvertently removed.

Other objects and advantages of the present invention will become apparent as the following description proceeds.

SUMMARY OF THE INVENTION

With the foregoing in mind, it is intended that the shelf display clip of the present invention will be utilized with channel extrusions of conventional type that are commonly employed on stock shelves in grocery stores. Such channel extrusions have two or more opposed parallel lips projecting from the front faces thereof which define elongate channels for receipt of price cards and/or other informational material. It, however, should be understood that the shelf display clip may have or be found to have other uses than those specifically mentioned.

The shelf display clip of the present invention comprises a main clip element having a center body portion and at least two radiating legs integrally formed therewith. Each leg has formed integrallY at the outer end thereof a foot and is resiliently deflectable for insertion into the channel of the extrusion with the feet being urged by the resilience of the legs into tight engagement with at least one of the lips firmly to hold the clip to the channel extrusion. The shelf display clip further comprises means operatively associated with the main clip element for supporting thereon display and/or informational material.

According to the preferred embodiment of the invention, the main clip element is spider shape having four such radiating legs generally circumferentially equally spaced. Opposed pairs of the legs are adapted to be urged by the resilience of the same into tight engagement with the opposed parallel lips defining the channel in the channel extrusion, respectively. The center body portion has a forwardly opening hole for receiving therein preferably with a lock or friction fit the stem of a male element for supporting the same.

Such male element may comprise a dart or button fastener receivable in such hole in the central body portion of the main clip element for securing the display and/or informational material or a container therefor either flush with or perpendicular to the channel extrusion. The dart fastener includes a large fastener head and stem therefor and an enlarged arrow head at the end of the stem which, when the stem is inserted in such hole, will project outwardly beyond such opening to lock the dart fastener in place. To facilitate insertion of the dart fastener into such hole, the stem preferably has an elongate axial slot therein defining two coacting resilient stem portions which are urged toward each other to permit passage of the enlarged arrow head through such hole in the main clip element and then expand the arrow head when without the hole to lock the dart fastener to the main clip element. The button fastener may employ a friction fit between the stem thereof and the main clip element to ensure retention of the same yet providing for ready removal of the display and/or informational material when desired.

The main body element may also have a boss portion offset from and connected by a connecting web to such central body portion. Such boss portion may be provided with a hole for receipt of the male elements below the channel whereby price and/or other informational material carried in the channel extrusion will not be obscured by the display and/or informational material supported by such male elements.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIGS. 7 and 10-12 are, respectively, an end view and fragmented perspective views illustrating various applications of the shelf display clip of the present invention, and more particularly:

FIG. 7 shows the shelf display clip mounting in horizontally flush relationship a pad of sheets of literature on the channel extrusion;

FIG. 10 shows the shelf display clip mounting in vertically offset, horizontally flush relationship a pad of sheets of literature on the channel extrusion;

FIG. 11 shows the shelf display clip mounting in horizontally perpendicular relationship a display sign on the shelf;

FIG. 12 shows two shelf display clips mounting on the shelf in vertically offset relationship a container which may contain display and information material, small articles or products.

DESCRIPTION OF THE PREFERRED EMBODIMENT

Figure 1:
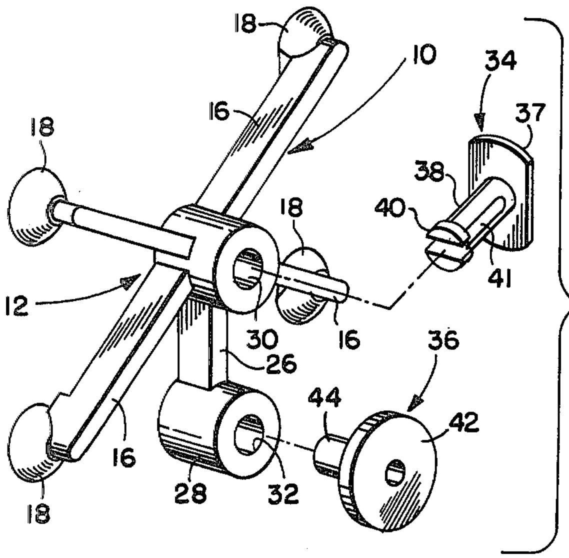
FIG. 1 is an exploded perspective view of the shelf display clip according to the present invention illustrating the main clip element and male fastening elements thereof.
Figure 2:
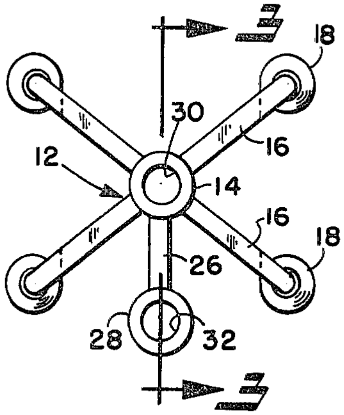
FIGS. 2-4 are front, side and rear elevation views of the main clip element of the shelf display clip of FIG. 1, respectively, FIG. 3 being taken along the line 3—3 of FIG. 2 and FIG. 4 being taken along the line 4—4 of FIG. 3.

Referring now in greater detail to the drawings and initially to FIGS. 1-4, the shelf display clip is indicated generally by reference numeral 10 and comprises a main clip element 12 which has a cylindrical center body portion 14 and legs 16 integrally formed with and radiating from the center body portion 14. According to the preferred embodiment which is shown, there are four such legs 16 which are substantially co-planar and are generally circumferentially equally spaced giving the main clip element a spider-like shape. However, it will be appreciated below that the main clip element 12 need only be provided two or more legs 16. Moreover, although the legs are generally equally circumferentially spaced and of equal length, the angle formed between the legs of opposed pairs of legs may be obtuse thus making the main clip element slightly elongate for a reason to be described below.

Figure 3:
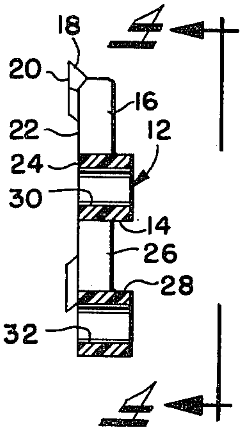
Figure 4:
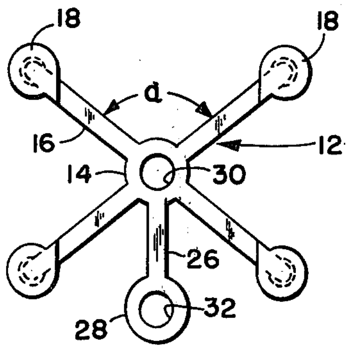

The legs 16 are resiliently deflectable towards each other for a purpose to be described and each has formed integrally at its radially outer end a foot 18 which preferably is wedge-shape. As shown, each foot 18 is in the form of a truncated cone having its axis oriented substantially normal to the common plane of the legs. Because of this conical shape, the feet provide a wedge surface regardless of the extent of deflection of the legs. Further, the base 20 of each wedge foot extends slightly from the rear surface 22 of its corresponding leg as best seen in FIG. 3, as well as from the rear surface 24 of the center portion 12 which may be flush with the rear surface of each leg for clearance purposes as will become apparent below.

The main clip element 12 further comprises a connecting web 26 which is integrally formed with and radiates outwardly from the center body portion 14 between two of the legs 16 and has integrally formed at its radially outer end a cylindrical boss portion 28 in offset relationship to the center body portion. The center body portion and offset boss portion both have, respectively, forwardly opening circular holes 30 and 32 which have their axes orientated normal to the common plane of the legs 16 and which are adapted to receive a male fastener element such as dart fastener 34 or button fastener 36. The holes 30 and 32 may be closed at their rearward ends but preferably are open for permitting full insertion of the dart fastener 34 in the manner described below.

The dart fastener 34 includes a large head 37 and an elongate cylindrical stem 38 with an enlarged arrow head 40 formed at the outer end thereof. The stem 38 is of a diameter slightly less than that of the holes 30 or 32 and the enlarged arrow head 40 is of a larger diameter. The stem 38 preferably includes an elongate axial slot 41 extending at least partially the length of the stem 38 from the end thereof dividing the stem into two coacting resilient portions which are urged together with the stem is inserted in either hole 30 or 32 to permit the enlarged arrow head thereof to pass through such smaller diameter hole. The length of the stem 38 is such that, when inserted, the arrow head 40 will project rearwardly outwardly from the main clip element 12 and will expand to its enlarged diameter thus locking the dart fastener in place. The button fastener 36 includes a large circular head 42 and short stem 44, the latter being of a diameter to effect a friction fit when inserted in either of the holes 30 or 32 of the center body or offset boss portions, respectively, for retention of the button fastener.

Figure 13:
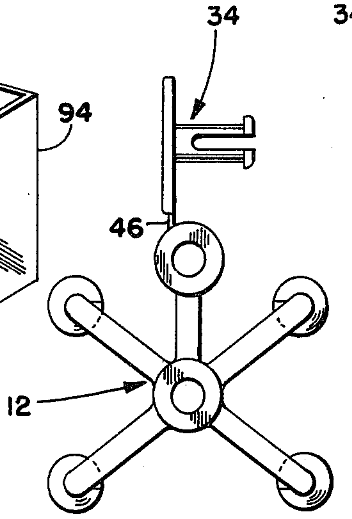
FIGS. 13 and 14 are, respectively, a top plan view and elevation of the main clip element and a male fastening element as received from a unitary mold for the same.
Figure 14:
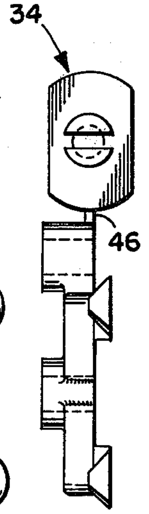

The main clip element 12, dart fastener 34 and button fastener 36 preferably are made of plastic such as polypropylene or styrene. As seen in FIGS. 13 and 14, the clip element and dart fastener may be molded in the same plane with the parts being joined by a frangible bridge 46. Such manufacture permits molding of the parts as a unit which facilitates packaging of the same. The parts may be separated by a displayer by fracturing the bridge 46. It will be appreciated that such shelf display clip may be conveniently packaged along with display and/or informational material to be supported thereon to facilitate distribution to displayers.

Figure 5:
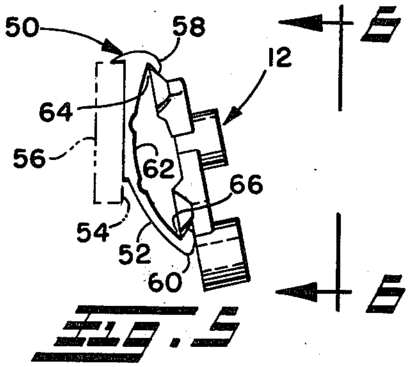
FIG. 5 is an end view showing the main clip element received in a channel extrusion of the single-track type which is mounted on a shelf at the latter's front edge.
Figure 6:
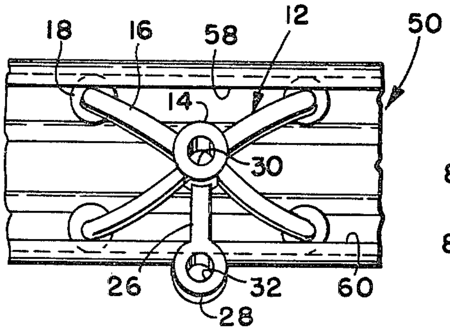
FIG. 6 is a fragmented front view of the assembled main clip element and channel extrusion of FIG. 5 as seen from the line 6—6 thereof.

Referring now to FIGS. 5 and 6, it will be seen that the main clip element 12 of the display clip 10 may be received in and supported by an elongate channel extrusion 50 of the single-track type commonly provided along and secured to the forward edges of stock shelves in grocery stores. As best seen in FIG. 5, the channel extrusion 50 has a back surface 52 which is substantially flat at the upper portion thereof and abuts against the edge surface 54 of the shelf 56 to which it is secured by suitable fasteners (see FIG. 12). Along the upper and lower edges of the extrusion 50 are, respectively, upper and lower flanges or lips, 58 and 60, which extend forwardly and inwardly to form with the front face 62 of the extrusion opposed, oppositely facing upper and lower grooves, 64 and 66. The upper and lower grooves cooperate to define an elongate channel in which commonly are side fitted therein price cards and/or informational material with the top and bottom edges of such items being retained by the corresponding flange lips. To facilitate reading of the card by a shopper, the lower end thereof projects slightly forwardly whereby the card will be slightly upwardly facing. In similar fashion, the main clip element will be similarly disposed as seen in FIG. 5.

To insert the main clip element 12 into the extrusion 50, the main clip element 12 is orientated relative to the extrusion with the feet 18 of opposed pairs of legs 16 transversely aligned, respectively, with the upper and lower lips 58 and 60 of the channel extrusion. When so positioned, the feet of the upper pair of legs will be vertically aligned with the corresponding feet of the lower pair of legs and normally will give the main clip element an overall height greater than the distance between the upper and lower lips. The vertically aligned legs may then be resiliently deflected toward each other such that the maximum spacings between the feet thereof are smaller than the spacing between the upper and lower lips to allow for insertion of the clip into the channel. When the legs are released within the channel, the legs will resiliently urge the feet into wedging and captive engagement with the lips tightly holding the main clip element in the channel extrusion. Preferably, the legs are of such resiliency so that they may be compressed by the fingers of the hand for insertion into the extrusion. To position the shelf display clip along the extrusion, the main clip element may be easily slid in the channel extrusion as desired.

Alternatively, the main clip element 12 may be inserted at an open end of the channel extrusion 50. In such case, the vertically aligned legs need only be deformed to permit insertion of the same directly into the oppositely facing grooves 64 and 66.

It should now be appreciated that the main clip element 12 may be provided with two or more legs 16 according to the invention. In the event the clip element has two legs, such will radiate from the center body portion with the angle formed between such legs beng less than 180° and their length being such that the feet of such legs will be urged by the resilience of the legs into tight engagement with one of the flange lips and the central body portion or appendage thereon into engagement with the other flange lip. Preferably, a slight detent will be provided in the central body portion to receive the edge of the lip to prevent the central body portion from slipping relative to such lip. Where there are three such legs, the third leg will extend oppositely from the body and engage the other lip at the foot thereof.

Figure 8:
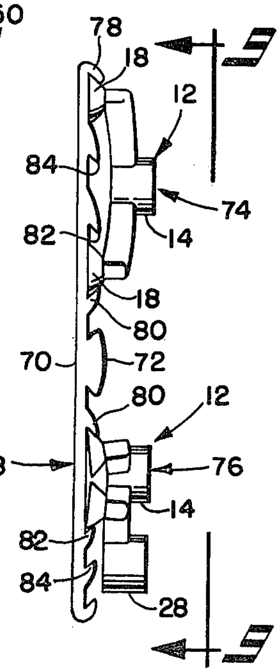
FIG. 8 is an end view showing two main clip elements received in different sized channels of different tracks of a double-track channel extrusion.
Figure 9:
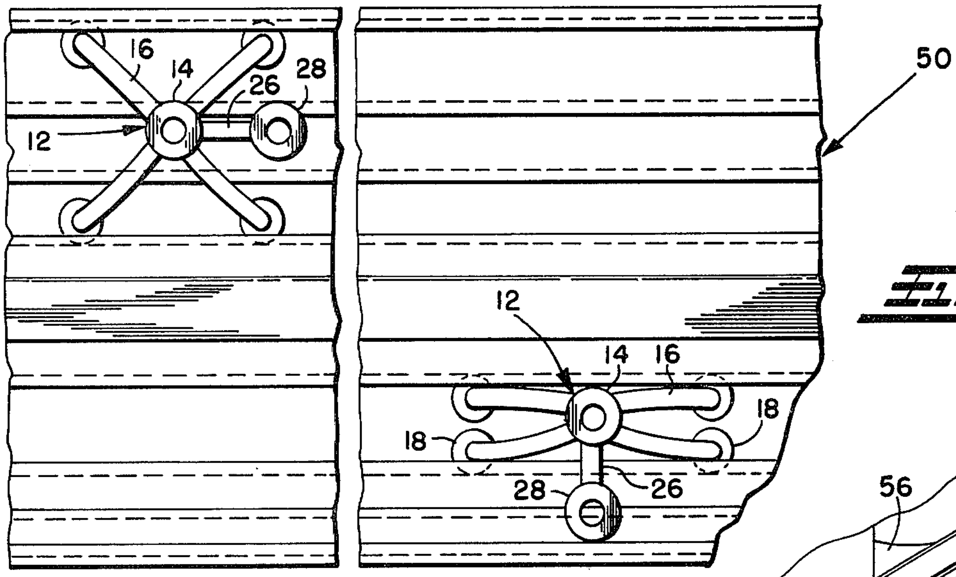
FIG. 9 is a fragmented front view of the assembled main clip elements and channel extrusion of FIG. 8 as seen from the line 9—9 of FIG. 8.

Referring now to FIGS. 8 and 9, a double-track type of channel extrusion is designated generally by reference numeral 68 and includes a substantially planar back surface 70 adapted to abut the edge of a shelf. The front face 72 of the extrusion 68 has formed thereon a plurality of forwardly extending lips, several of which extend upwardly and others downwardly to define a plurality of channels in upper and lower tracks 74 and 76, respectively. Oppositely directed outer and inner lips 78 and 80 at the top and bottom of each track define a large channel while inner and outer intermediate lips 82 and 84 directed oppositely to the inner lips 80 cooperate therewith to define channels of varying sizes. The spacings between the several lips may vary between upper and lower tracks. Also, opposed lips of the upper and lower tracks may cooperate to define channels spanning the two tracks.

As shown in FIGS. 8 and 9, two main clip elements 12 are inserted in the extrusion, one being retained between the outer lip 78 and the inner lip 80 of the upper track 74 and the other element being retained between the more closely spaced inner intermediate lip 82 and inner lip 80 of the lower track 76. In the former instance, the rearwardly projecting feet 18 provide sufficient clearance between the intermediate lips and the legs 16, central body portions 14 and/or offset portions 28 to permit insertion of the main clip elements into their respective channels.

It can thus be seen that the shelf display clip may be used with channels of different sizes. For large channels, the main clip element is positioned with its greater dimension spanning the lips. For smaller channels, the main clip element is positioned with its greater dimension extending along the length of the channel. The offset boss 28 may be either vertically or horizontally aligned with the center body portion 14.

Referring now to FIGS. 7 and 10-12, various applications of the shelf display clip 10 of the present invention are shown in connection with a price channel extrusion of the single-track type. It of course is understood that the uses shown are only illustrative of a few of the ways in which the display clip may be used, and, of course, the display clip may be used in similar manner with a channel extrusion of the double-track type.

Figure 7:
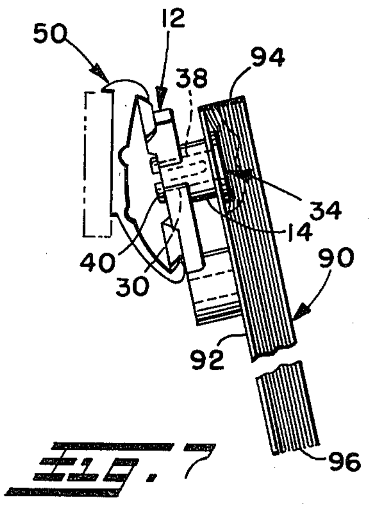
FIG. 7 is an end view illustrating an application of the shelf display clip wherein the clip mounts in horizontally flush relationship a pad of sheets of literature on the channel extrusion.

As shown in FIG. 7, the display clip 10 may support a pad 90 comprised of a cardboard backing 92 to which are secured by gummed top 94 a plurality of sheets 96 which may have printed matter thereon such as recipes. The main clip element 12 is positioned in the channel extrusion 50 at a desired location. The stem 38 of dart fastener 34 extends through an opening in the backing 92 at the top thereof and into the main clip element 12 where it is received in the bore 30 of the center body portion 14 with the arrow head 40 projecting beyond the center body portion and expanded thus locking the fastener in place to securely support the pad on the display clip. With the pad so securely supported, a customer may pull off a single sheet without inadvertently removing the entire pad from the shelf channel extrusion.

Figure 10:
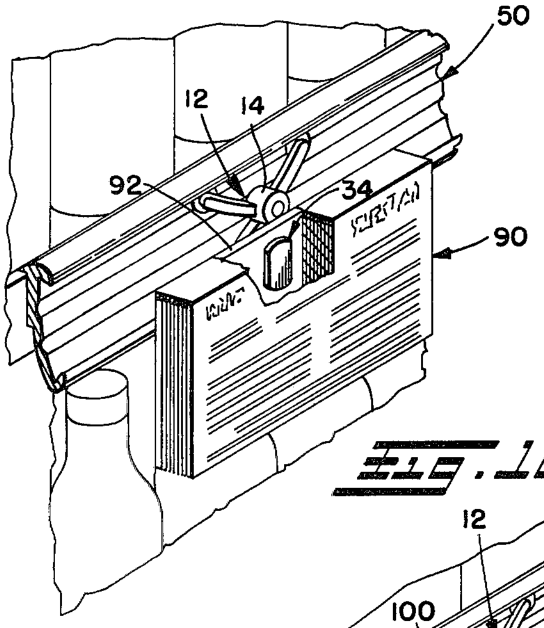

In FIG. 10, the main clip element 12 is positioned in the channel extrusion 50 such that the offset boss thereof depends from the center body portion 14. The dart fastener 34 extends through the opening in the backing 92 of pad 90 and into the hole 32 in the offset boss portion 28. The pad 90 thus can be mounted essentially below the channel extrusion so that information cards received in the channel extrusion are not obstructed from view.

Figure 11:
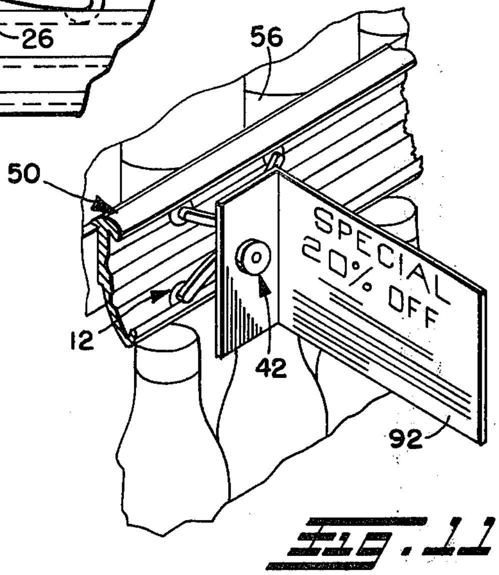

FIG. 11 illustrates the display clip 10 being employed to display information normal to the longitudinal extent of the shelf 56. A display card 92 is folded to form a section normal to the shelf on which may be printed information and a section parallel to the shelf which includes an opening through which the stem of the button 42 extends for securing the sign to the main clip element 12.

Figure 12:
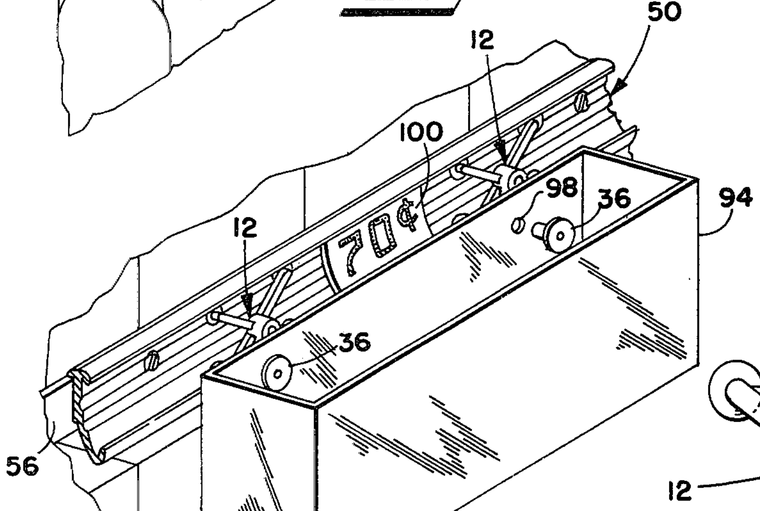

Still another usage of the display clip 10 is shown in FIG. 12 wherein a pair of main clip elements 12 are employed to support an open-top container or box 94. The main clip elements are received in spaced relationship in the channel extrusion 50 with the offset bosses 28 of each depending downwardly from their respective center portions 14. The box at its rear wall 96 includes a pair of openings 98 aligned respectively with the holes in the offset bosses. Button fasteners 36 are provided which extend through the openings in the box for receipt in the holes in the offset bosses to secure the box to the main clip elements and thus to the shelf. With the openings located near the upper edge of the rear wall of the box and the fasteners secured in the offset bosses, it can be seen that a price card 100 retained in the extrusion will not be obscured from view.

I claim:

1. A clip for use with a channel, the channel having at least two spaced lips on the face thereof defining opposed grooves, said clip having a center body portion from which radiate at least two, resilient, straight legs forming a V with the body portion at the vertex of the V, the distal ends of which legs are deflectable in a plane substantially parallel to the plane of, and for engagement in at least one of, the opposed grooves, which engaged distal ends are urged by the resilience of said legs into tight engagement with the grooves to aid in securing said clip to the channel, said body portion including means for supporting items therefrom; and wherein said distal ends of said legs have feet rearwardly offset from and integral with said legs, which feet are substantially of frustum shape, the base of each of which feet is roughly parallel to the common plane of the V and is the rearward-most portion of each foot, and said feet are for said engagement of said distal ends with the grooves.

2. A clip for use with a channel, the channel having at least two spaced lips on the face thereof defining opposed grooves, said clip having a center body portion from which radiate four, resilient, straight legs to give said clip substantially an X-shape, wherein the distal ends of a first two of said legs are engageable with one of the grooves and the distal ends of the remaining two legs are engageable with one of the opposed grooves to secure said clip to the channel, said clip including means for supporting items therefrom; and wherein said first two legs are adjacent each other, said remaining two legs are adjacent each other, and the distal ends of said first two of said legs are engageable with said one of the grooves by deflecting apart the distal ends of said first two legs, and the distal ends of said remaining two legs are engageable with said one of the opposed grooves by deflecting apart the distal ends of said remaining two legs, which four legs are coplanar and deflectable in a plane parallel to the plane of the opposed grooves and which engaged distal ends are urged by the resilience of said first two legs and said remaining two legs, into tight engagement with said one of the grooves and said one of the opposed grooves, respectively; and wherein said first two of said legs may be any two adjacent legs of said four legs, and said clip may be secured to the channel in any one of four orientations, with respect to the channel, about an axis through the center of said clip and normal to the plane of said legs, any of said four orientations differing from any other of said orientations by an approximate angle of either 90° or 180°; and wherein the distal ends of said four legs define the vertices of a rectangle having a length greater than its width, and two of said orientations, differing from one another by an angle of approximately 180°, are with said length of said rectangle approximately normal to the length of the channel, and the remaining two orientations, differing from one another by an angle of approximately 180°, are with said length of said rectangle approximately parallel to the length of the channel, wherein said clip may be secured to a channel having any one of a plurality of distances between the opposed grooves, ranging from short distances, in which case said clip may be positioned in either of said two orientations in which said length of said rectangle is approximately parallel to the channel, to farther distances, in which second case said clip may be positioned in either of said two orientations in which said length of said rectangle is approximately normal to the length of the channel.

3. A clip for use with a channel, the channel having at least two spaced lips on the face thereof defining opposed grooves, said clip having a center body portion from which radiate four, resilient, straight legs to give said clip substantially an X-shape, wherein the distal ends of a first two of said legs are engageable with one of the grooves and the distal ends of the remaining two legs are engageable with one of the opposed grooves to secure said clip to the channel, said clip including means for supporting items therefrom; and wherein said distal ends of said four legs have feet rearwardly offset from and integral with said four legs, which feet are substantially of frustum shape, the base of each of which is roughly parallel to said plane of said legs, and said base of each foot is the rearwardmost portion of said foot and said feet are for engagement with the grooves.

4. A clip for use with a channel, the channel having at least two spaced lips on the face thereof defining opposed grooves, said clip having a center body portion from which radiate four, resilient, straight legs to give said clip substantially an X-shape, wherein the distal ends of a first two of said legs are engageable with one of the grooves and the distal ends of the remaining two legs are engageable with one of the opposed grooves to secure said clip to said channel, said clip including means for supporting items therefrom; and wherein said clip is composed of plastic.

5. A clip for use with a channel, the channel having at least two spaced lips on the face thereof defining opposed grooves, said clip having center body portion from which radiate at least two, resilient straight legs forming a V with the body portion at the vertex of the V, the distal ends of which legs are deflectable in a plane substantially parallel to the plane of, and for engagement in at least one of, the opposed grooves, which engaged distal ends are urged by the resilience of said legs into tight engagement with the grooves to aid in securing said clip to the channel, said body portion including means for supporting items therefrom; and wherein said center body portion has a boss and said means for supporting items therefrom include said boss and a male member which may be inserted and secured within said boss.

6. A clip for use with a channel, the channel having at least two spaced lips on the face thereof defining opposed grooves, said clip having a center body portion from which radiate four, resilient, straight legs to give said clip substantially an X-shape, wherein the distal ends of a first two of said legs are engageable with one of the grooves and the distal ends of the remaining two legs are engageable with one of the opposed grooves to secure said clip to the channel, said clip including means for supporting items therefrom; and wherein said center body portion has a boss and said means for supporting items therefrom include said boss and a male member which may be inserted and secured within said boss.

* * * * *